(12) United States Patent
Miyazaki et al.

(10) Patent No.: US 10,663,045 B2
(45) Date of Patent: May 26, 2020

(54) SCREW SHAFT, MANUFACTURING METHOD THEREOF, AND BALL SCREW DEVICE

(71) Applicant: NSK LTD., Tokyo (JP)

(72) Inventors: Kazunari Miyazaki, Tokyo (JP); Keisuke Muto, Fujisawa (JP); Yutaka Nagai, Fujisawa (JP); Satoru Arai, Fujisawa (JP); Daisuke Maruyama, Fujisawa (JP); Masahiro Nobutomo, Fujisawa (JP)

(73) Assignee: NSK LTD., Tokyo (JP)

( * ) Notice: Subject to any disclaimer, the term of this patent is extended or adjusted under 35 U.S.C. 154(b) by 277 days.

(21) Appl. No.: 15/563,113

(22) PCT Filed: Mar. 31, 2016

(86) PCT No.: PCT/JP2016/060808
§ 371 (c)(1),
(2) Date: Sep. 29, 2017

(87) PCT Pub. No.: WO2016/159303
PCT Pub. Date: Oct. 6, 2016

(65) Prior Publication Data
US 2018/0087636 A1    Mar. 29, 2018

(30) Foreign Application Priority Data

Apr. 2, 2015  (JP) ................................. 2015-076089
Apr. 2, 2015  (JP) ................................. 2015-076090
(Continued)

(51) Int. Cl.
*F16H 25/22* (2006.01)
*F16H 25/24* (2006.01)

(52) U.S. Cl.
CPC ......... *F16H 25/2409* (2013.01); *F16H 25/22* (2013.01); *F16H 25/2204* (2013.01);
(Continued)

(58) Field of Classification Search
CPC .................... F16H 25/2409; F16H 25/2204
See application file for complete search history.

(56) References Cited

U.S. PATENT DOCUMENTS 4,811,618 A * 3/1989 Takayama ............... F16H 25/22
                                                     411/438
5,080,547 A     1/1992  Moghe
(Continued)

FOREIGN PATENT DOCUMENTS

CN   103410941 A    11/2013
CN   104033558 A     9/2014
(Continued)

OTHER PUBLICATIONS

Communication dated Apr. 10, 2018, issued by the European Patent Office in counterpart European application No. 16773183.5.
(Continued)

*Primary Examiner* — David M Fenstermacher
(74) *Attorney, Agent, or Firm* — Sughrue Mion, PLLC (57) ABSTRACT

Provided is a screw shaft in a ball screw device. At least a part of the screw shaft includes a cylindrical body which is manufactured by a filament winding method or a sheet winding method, and a spiral member or a partitioned spiral member which is fixed to an outer circumferential surface of the cylindrical body and forms a thread groove.

8 Claims, 9 Drawing Sheets

(30) Foreign Application Priority Data

| Jul. 17, 2015 | (JP) | 2015-143036 |
| Jul. 17, 2015 | (JP) | 2015-143037 |
| Jul. 17, 2015 | (JP) | 2015-143038 |
| Feb. 8, 2016 | (JP) | 2016-021958 |
| Feb. 8, 2016 | (JP) | 2016-021959 |

(52) U.S. Cl.
  CPC ......... *F16H 25/24* (2013.01); *F16H 25/2427* (2013.01); *F16H 2025/2481* (2013.01)

(56) References Cited

U.S. PATENT DOCUMENTS

| 5,551,314 | A | 9/1996 | Andrzejewski, Jr. et al. |
| 5,913,941 | A * | 6/1999 | Erikson ............... B23Q 5/40 74/424.95 |
| 6,415,673 | B1 * | 7/2002 | Erikson ............... B23Q 5/40 74/424.94 |
| 6,422,101 | B2 * | 7/2002 | Erikson ............... B23Q 5/40 74/424.72 |
| 2001/0020398 | A1 * | 9/2001 | Erikson ............... B23Q 5/40 74/89.36 |
| 2008/0144981 | A1 | 6/2008 | Shirai et al. |
| 2009/0100949 | A1 | 4/2009 | Shirai et al. |
| 2012/0325036 | A1 * | 12/2012 | Harada ............... B21J 5/12 74/424.86 |
| 2013/0008275 | A1 * | 1/2013 | Watanabe ............. B21J 5/12 74/424.86 |
| 2013/0220047 | A1 * | 8/2013 | Yokoyama ........ F16H 25/2223 74/424.87 |
| 2013/0267333 | A1 | 10/2013 | Lutz |
| 2015/0114156 | A1 | 4/2015 | Ishizaki et al. |

FOREIGN PATENT DOCUMENTS

| CN | 104395643 A | 3/2015 |
| DE | 10 2010 044 464 A1 | 3/2012 |
| DE | 10 2011 120 197 A1 | 6/2013 |
| JP | 8-121561 A | 5/1996 |
| JP | 11-43721 A | 2/1999 |
| JP | 2005-127379 A | 5/2005 |
| JP | 4013269 B2 | 11/2007 |
| JP | 2008-248247 A | 10/2008 |
| JP | 2010-138928 A | 6/2010 |
| JP | 4813373 B2 | 11/2011 |
| JP | 4842954 B2 | 12/2011 |
| JP | 5146293 B2 | 2/2013 |
| WO | 2006/068089 A1 | 6/2006 |
| WO | 2007/023634 A1 | 3/2007 |

OTHER PUBLICATIONS

Communication dated Apr. 25, 2019, issued by the Chinese Patent Office in counterpart Chinese Application No. 201680020687.2.
Search Report dated Jun. 14, 2016, issued by the International Searching Authority in counterpart International Patent Application No. PCT/JP2016/060808 (PCT/ISA/210).
Written Opinion dated Jun. 14, 2016, issued by the International Searching Authority in counterpart International Patent Application No. PCT/JP2016/060808 (PCT/ISA/237).

* cited by examiner

SCREW SHAFT, MANUFACTURING METHOD THEREOF, AND BALL SCREW DEVICE

TECHNICAL FIELD

The present invention relates to a ball screw device which is used in a machine tool or a construction machine, and which converts a rotational motion into a rectilinear motion, a screw shaft thereof, and a manufacturing method of the screw shaft.

BACKGROUND ART

In a ball screw device which is used in a machine tool or a construction machine, a metal material having high hardness, such as high carbon chromium bearing steel, stainless steel, or case hardening steel, has been generally employed. However, in recent years, weight reduction has been strongly required, and by changing a screw shaft, which takes most part of the weight among members which configure the ball screw device, from the above-described steel material to fiber reinforced plastic (FRP), the weight reduction is achieved.

For example, Patent Document 1 describes that a filament bundle including organic fibers is wound by helical winding or parallel winding while being impregnated with a liquid thermosetting resin around a core made of aluminum or iron, is thermally cured, and is made into a columnar body, and then, is cut into a shape of the screw shaft.

In addition, Patent Document 2 describes a motion guide device in which the vicinity of a rolling body rolling surface consists of a metal material and other parts consist of FRP.

Furthermore, Patent Document 3 describes that, in a motion guide device which is used in a mechanical device which handles an X-ray, a lifespan is improved by using FRP which is an X-ray transmitting material in at least one of a track member, a moving member, and a rolling body, and by making a steel tape stick to a rolling body rolling surface.

RELATED ART REFERENCE

Patent Document

Patent Document 1: Japanese Patent No. 5146293
Patent Document 2: Japanese Patent No. 4813373
Patent Document 3: Japanese Patent No. 4842954

SUMMARY OF THE INVENTION

Problems to be Solved by the Invention

However, in the screw shaft of Patent Document 1, an outer circumferential surface thereof is bonded with a filament bundle using a binder resin, and abrasion caused by the rolling of the ball cannot be avoided. In addition, the core still remains, and further weight reduction is required.

In addition, it is necessary that the screw shaft has a long length and high strength for suppressing bending, but the screw shafts of Patent Documents 2 and 3 consist of FRP in which reinforced fibers are dispersed to a resin, does not obtain sufficient strength, and can hardly correspond to a long screw shaft.

The present invention has been made in consideration of the above-described problem, and an object thereof is to provide a screw shaft having more excellent abrasion resistance with higher strength than that of the related art while further reducing the weight.

Means for Solving the Problems

In the present invention for solving the above-described problem, there are provided the following screw shaft, a manufacturing method thereof, and a ball screw device.

(1) A screw shaft in a ball screw device including the screw shaft in which thread grooves are formed on an outer circumferential surface, a plurality of balls which are disposed on the thread grooves, and a nut which is externally fitted to the screw shaft via the balls, the nut moving on the screw shaft, at least a part of the screw shaft including:

a cylindrical body formed of a cylindrical wound material configured of a filament bundle of reinforced fibers, a cylindrical wound material configured of a sheet of a filament of reinforced fibers, or a cylindrical wound material which is a laminated layer of a layer configured of the sheet and a layer configured of the filament bundle, and a resin binding the cylindrical wound material; and a metal spiral member which is fixed to an outer circumferential surface of the cylindrical body and forms the thread groove.

(2) The screw shaft according to the above-described (1), wherein the spiral member is configured of a plurality of partitioned spiral members which are partitioned in a length direction of a spiral, and the partitioned spiral members are connected to each other with a gap in the length direction.

(3) The screw shaft according to the above-described (2), wherein the gap in the length direction of the spiral between the partitioned spiral members is 0.3% to 13% of a diameter of the ball.

(4) The screw shaft according to any one of the above-described (1) to (3), wherein the outer circumferential surface of the cylindrical body and the spiral member or the partitioned spiral member are fixed to each other by an adhesive.

(5) A manufacturing method of a screw shaft in a ball screw device including the screw shaft in which a thread groove is formed on an outer circumferential surface, a plurality of rolling bodies which are disposed on the thread groove, and a nut which is externally fitted to the screw shaft via the rolling body, the nut moving on the screw shaft, the method comprising:

a cylindrical body manufacturing process of making a cylindrical body by a filament winding method using a filament bundle of reinforced fibers, a cylindrical body by a sheet winding method using a sheet configured of the filament bundle, or a cylindrical body obtained by laminating a layer made by the sheet winding method and a layer made by the filament winding method; and an integration process of fixing a metal spiral member which forms the thread groove on an outer circumferential surface of the cylindrical body.

(6) The manufacturing method of a screw shaft according to the above-described (5), wherein the spiral member is a partitioned spiral member which is partitioned in a length direction thereof, and in the integration process, a plurality of the partitioned spiral members are connected to each other on the outer circumferential surface of the cylindrical body with a gap in the length direction and are fixed to the outer circumferential surface.

(7) The manufacturing method of a screw shaft according to the above-described (6), wherein the gap in the length direction of a spiral between the partitioned spiral members is 0.3% to 13% of a diameter of the ball.

(8) The manufacturing method of a screw shaft according to any one of the above-described (5) to (7), wherein, in the integration process, the spiral member or the partitioned spiral member adheres to the outer circumferential surface of the cylindrical body by an adhesive.

(9) The manufacturing method of a screw shaft according to the above-described (5), wherein, in the integration process, the spiral member is disposed on the outer circumferential surface of the cylindrical body, and is heated, and the entire spiral member contracts in a radial direction thereof.

(10) A ball screw device comprising:
a screw shaft in which thread grooves are formed on an outer circumferential surface:
a plurality of balls which are disposed on the thread grooves; and
a nut which is externally fitted to the screw shaft via the balls, the nut moving on the screw shaft, wherein the screw shaft is the screw shaft according to any one of the above-described (1) to (4).

Advantages of the Invention

According to the present invention, a screw shaft having more excellent abrasion resistance with higher strength than that of the related art while further reducing the weight, can be obtained. In addition, a ball screw device of the present invention has reduced the weight by providing such a screw shaft and has more excellent durability than that of the related art.

BRIEF DESCRIPTION OF THE DRAWINGS

FIGS. 3A and 3B are schematic views describing a winding method of a filament bundle in the filament winding method, wherein

MODES FOR CARRYING OUT THE INVENTION

Hereinafter, the present invention will be described in detail with reference to the drawings.

First Embodiment

Figure 1:
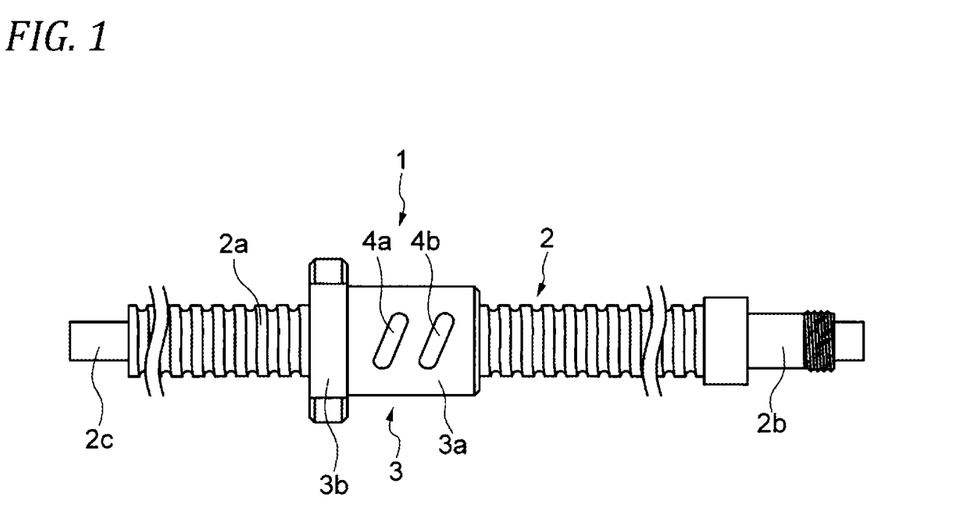
FIG. 1 is a plan view illustrating a ball screw device.

FIG. 1 is a plan view illustrating a ball screw device 1. As illustrated in the drawing, the ball screw device 1 includes a rod-like screw shaft 2, and a nut 3 which is externally fitted to the screw shaft 2.

The screw shaft 2 includes a thread groove portion 2a in which a spiral thread groove is formed on an outer circumferential surface, a driving side end portion 2b which is formed to be continuous to one end portion of the thread groove portion 2a, and an anti-driving side end portion 2c which is formed to be continuous to the other end portion of the thread groove portion 2a.

The nut 3 includes a tubular portion 3a in which the screw shaft 2 passes through an inner side thereof, and a flange 3b which is formed to be integrated with one end portion of the tubular portion 3a. On an inner circumferential surface of the tubular portion 3a, a thread groove which corresponds to the thread groove formed in the thread groove portion 2a is formed.

Figure 4:
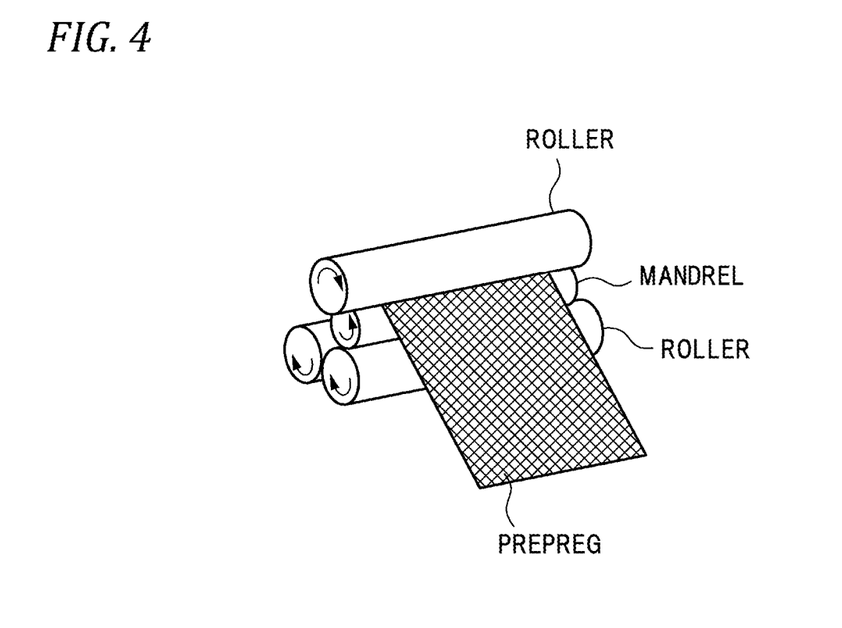
FIG. 4 is a schematic view for describing a sheet winding method.
Figure 5:
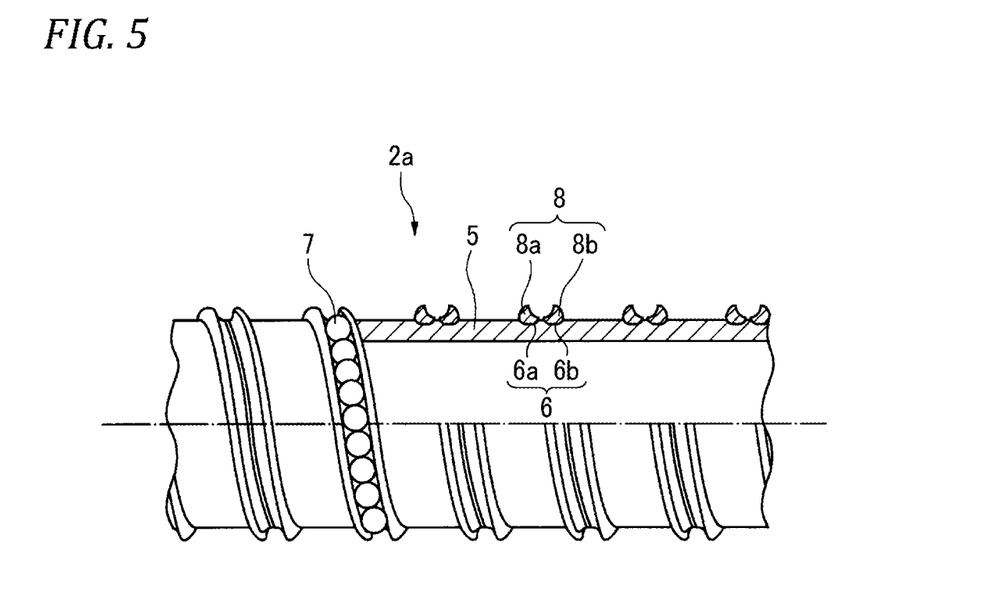
FIG. 5 is a partially cut-out plan view illustrating an example of a screw shaft in a first embodiment.

A plurality of balls are interposed between the tubular portion 3a and the thread groove portion 2a (refer to FIGS. 4 and 5, a reference number 7).

In the tubular portion 3a of the nut 3, segments 4a and 4b which circulate the rolling body are inserted into a through hole which penetrates in a radial direction. The segments 4a and 4b are formed of a resin, configure a passage that links two locations to each other of the thread groove formed on the inner side of the tubular portion 3a, and configure an endless circulating path in which the ball circulates.

By the above-described configuration, in the ball screw device 1, the screw shaft 2 and the nut 3 relatively move in an axis direction as the screw shaft 2 and the nut 3 relatively rotate.

In the present invention, the thread groove portion 2a of the screw shaft 2 is manufactured as follows.

First, a cylindrical body is manufactured by the filament winding method using a filament bundle of reinforced fibers. Otherwise, a cylindrical body may be manufactured by a sheet winding method using a sheet configured of a filament bundle of reinforced fibers. Otherwise, a cylindrical body can also be manufactured by laminating a layer made by the sheet winding method and a layer made by the filament winding method. Furthermore, in a case of lamination, it is preferable to use the layer made by the sheet winding method as a lower layer and to perform winding by the filament winding method thereon, from the viewpoint of strength.

Figure 2:
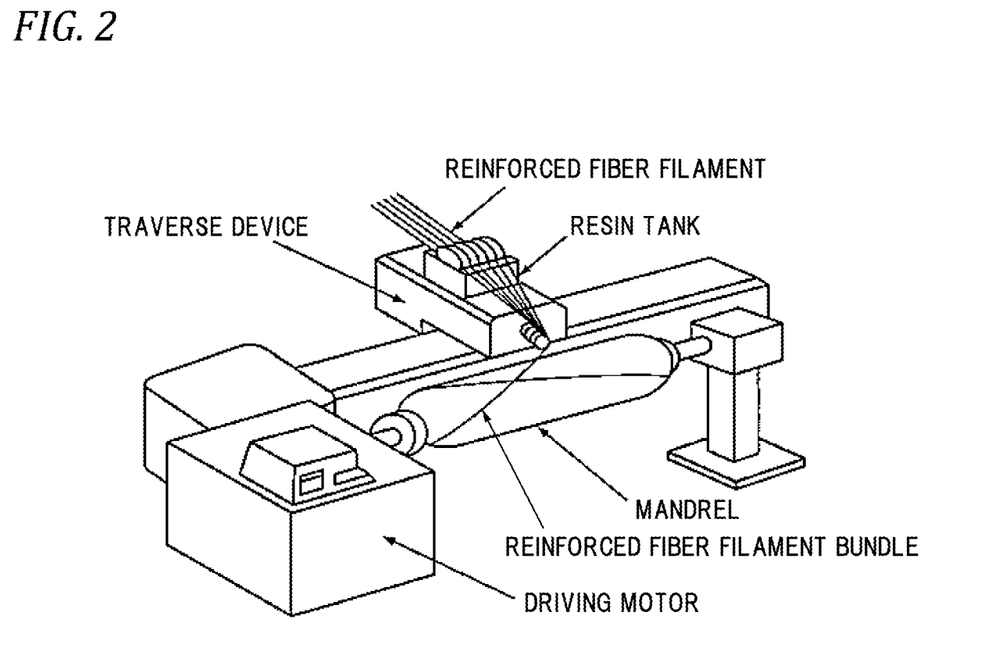
FIG. 2 is a schematic view illustrating a device configuration for describing a filament winding method.

FIG. 2 is a schematic view illustrating a device configuration for describing the filament winding method, but one filament bundle is made by bundling up a plurality of reinforced fiber filaments while coating or impregnating the reinforced fiber filaments with a binder resin through a resin tank in which the liquid binder resin is stored, and the reinforced fiber filament bundle is wound around a rotating mandrel (core rod) at a predetermined angle. The reinforced fiber filament bundle reciprocates on the mandrel by a traverse device. In addition, at a time point when a target winding thickness is achieved, by removing the reinforced fiber filament bundle with the mandrel from the device, by curing the binder resin in a curing oven, and by drawing out the mandrel after the curing, the cylindrical body in which the cylindrical wound material configured of the reinforced fiber filament bundle is bonded with the binder resin is obtained. Furthermore, in order to easily draw out the mandrel, it is preferable to coat the mandrel with a releasing agent in advance. Furthermore, as will be described later, a spiral member which forms the thread groove is fixed to the outer circumferential surface of the cylindrical body, but it is also possible to pull out the mandrel after fixing the spiral member.

Figure 3A:
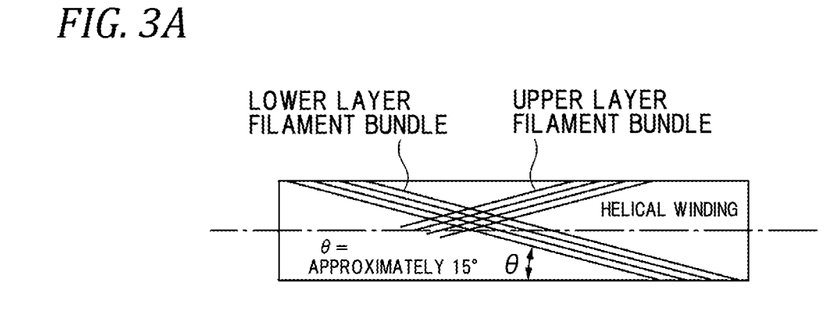
FIG. 3A is a view illustrating helical winding.
Figure 3B:
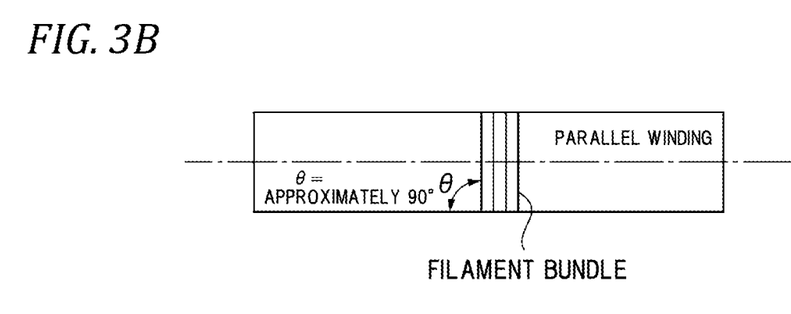
FIG. 3B is a view illustrating parallel winding, respectively.

A winding method of the reinforced fiber filament bundle can be roughly classified into helical winding for performing the winding to intersect the filament bundle on a lower layer at a certain angle (in the example of the drawing, θ=15°) as illustrated in FIG. 3A, and parallel winding for performing the winding to be perpendicular to the mandrel as illustrated in FIG. 3B, but the helical winding is excellent and preferable from the viewpoint of strength. Furthermore, an intersection angle (θ) in the helical winding is appropriately 10° to 85°, and 45° is particularly preferable.

In the above-described filament winding method, the parallel winding may be employed for the end portion of the cylindrical body, and the helical winding may be employed for parts other than the end portion. In order to adjust a shaft length of the screw shaft, there is a case of cutting the cylindrical body, but by performing the parallel winding with respect to the end portion, a sectional surface becomes parallel to the filament bundle, and compared to a case of the helical winding, the number of cut locations of the filament bundle can be reduced. When the helical winding is also performed with respect to the end portion, the entire filament bundle is cut.

In addition, as illustrated in FIG. 4, the sheet winding method is a method for winding a sheet-like prepreg which is obtained by knitting the reinforced fibers in a shape of a sheet and by binding the sheet using the binder resin around the mandrel by a rotating roller, and a cylindrical body can be obtained by drawing out the mandrel after curing the binder resin.

Furthermore, around the lower layer made by the sheet winding method, the filament bundle may be wound by the filament winding method.

In any case, regarding a thickness of the cylindrical body, in order to obtain sufficient strength as the screw shaft 2, the thickness is adjusted by the number of windings or the number of laminated layers of the filament bundle or the sheet considering the entire length of the screw shaft or a load applied to the screw shaft.

The reinforced fibers which form the filament bundle and the sheet are organic fibers or inorganic fibers in which tensile strength is equal to or greater than 500 MPa and is preferably equal to or greater than 3920 MPa, and a tensile modulus is equal to or greater than 30 GPa and is preferably equal to or greater than 235 GPa. Specifically, fibers described in the following table can be employed, but among these, carbon fibers (CF) which have light weight and high strength are preferable. Furthermore, any of PAN-based and pitch-based carbon fibers can be used.

TABLE 1

| Type of reinforced fibers | CF | GF | AF |
| --- | --- | --- | --- |
| Tensile strength (MPa) | 500 to 6100 | 1200 to 4600 | 1400 to 3300 |
| Tensile Modulus (GPa) | 30 to 700 | 55 to 100 | 77 to 130 |

In addition, examples of preferable reinforced fibers can include glass fibers (GF), aramid fibers (AF), boron fibers (BF), polyarylate fibers (PARF), poly-p-phenylenebenzoxazole fibers (PBOF), and ultra-high molecular weight polyethylene fibers (UHPEF).

In addition, in order to improve the adhesiveness with the binder resin of the reinforced fibers, it is also preferable to perform surface treatment using a sizing agent, such as a urethane resin, an epoxy resin, an acrylic resin, or a bismaleimide resin.

An average diameter of the reinforced fibers is preferably 5 to 21 μm, and is more preferably 7 to 15 μm. When the average diameter becomes less than 5 μm, the strength per one reinforced fiber is low, and it becomes difficult to perform stable manufacturing, the costs substantially increase, and thus, practicability becomes low. When the average diameter is greater than 21 μm, the strength per one reinforced fiber increases, the filament bundle becomes extremely thick, and it becomes difficult to perform accurate winding.

Furthermore. there are short fibers and long fibers in the fibers, the long fibers are preferable since the long fibers are excellent in strength, shock resistance, dimension accuracy, conductivity or the like, compared to the short fibers.

As the binder resin, an epoxy resin, a bismaleimide resin, a polyamide resin, a phenolic resin or the like can be used, and the binder resin is selected considering the adhesiveness with the reinforced fibers. For example, in a case of the carbon fibers, it is possible to use the epoxy resin. In addition, an amount of coating or impregnating of the binder resin with respect to the total amount of the filament bundle or the sheet of the reinforced fibers is preferably 15 to 45% by weight, is more preferably 20 to 40% by weight, and is still more preferably 24 to 33% by weight. When the amount of the binder resin becomes less than 15% by weight, the binding of the filament bundle or the sheet is not sufficient, and when the amount of the binder resin becomes greater than 45% by weight, the amount of the reinforced fibers becomes extremely small and sufficient strength cannot be obtained. Furthermore, the amount of the binder resin becomes the amount of the resin in the obtained screw shaft, and the remaining part becomes the amount of the reinforced fibers or the total amount including the sizing agent.

In addition, as illustrated in FIG. 5, a metal spiral member 8 which corresponds to the thread groove is fixed to the outer circumferential surface of a cylindrical body 5 made of fiber reinforced plastic and manufactured by the filament winding method or the sheet winding method. At this time, it is preferable to form a recessed portion 6 which corresponds to the thread groove in a spiral shape on the outer circumferential surface of the cylindrical body 5, and to regulate a position by allowing a part (bottom portion) of the spiral member 8 to be externally fitted to the recessed portion 6. The recessed portion 6 can be formed by the cutting or plastic working.

Since the spiral members 8 have a constant interval by an elastic force, it is possible to form a track groove having a constant interval in which a ball 7 travels without forming the recessed portion 6. However, by forming the recessed portion 6 and regulating the position, the ball 7 more stably travels.

The spiral member 8 is obtained by performing the processing a metal wire material into a spiral shape, and for example, can use a metal spring. As illustrated in FIG. 5, on the outer circumferential surface of the thread groove portion 2*a* of the screw shaft 2, the spiral member 8 forms a thread groove having one thread with a pair of spiral members 8*a* and 8*b*, and functions as a rolling portion of the ball 7. Therefore, it is important that the spiral member 8 is a material having excellent abrasion resistance, and is preferably a material having more excellent abrasion resistance than the material of the ball 7, surface hardness is preferably equal to or greater than HV 400, and a coil spring made of, for example, spring steel, hard steel wire, piano wire, or stainless steel, can be used. In addition, processing into a sectional shape illustrated in FIG. 5 or a sectional shape which will be described later and is illustrated in FIGS. 7, 9, 11, and 14 is performed, but the cutting or grinding can be performed as a processing method.

In addition, when processing the spiral member 8 into a shape of a spring, if a residual stress remains, settling or damage is likely to occur. Therefore, after the processing into the shape of the spring, it is preferable to perform low temperature annealing, and to reduce the residual stress. Furthermore, the processing temperature or the processing time is set to be various depending on the material.

As a fixing method of the spiral member 8, the spiral member 8 is externally fitted to the cylindrical body 5, an edge of an abutting portion of both of the spiral member 8 and the cylindrical body 5 is coated with the adhesive, and the adhesive is cured. In a case of forming the recessed portion 6 in the cylindrical body 5, the recessed portion 6 is coated with the adhesive, a part of the inner circumferential surface of the spiral member 8 is embedded therein, and the adhesive is cured. Furthermore, it is preferable that the adhesive is the same type as the binder resin which is used in the filament winding method or in the sheet winding method for manufacturing the cylindrical body 5. By using the same type of the adhesive and the binder resin, the adhesiveness between the spiral member 8 and the cylindrical body 5 increases.

However, as illustrated in FIG. 1, in a case where the anti-driving side end portion 2*c* (refer to FIG. 1) is a free end, when the temperature of the screw shaft 2 increases by the driving of the ball screw device 1, the anti-driving side end portion 2*c* extends to the outer side in the axis direction, and according to this, the spiral member 8 also extends in the length direction thereof. Therefore, since the spiral member 8 fixed by the adhesive in the vicinity of the anti-driving side end portion 2*c* comparatively largely extends, the spiral member 8 is likely to be peeled off from the screw shaft 2. Here, it is preferable that the amount of the adhesive in the vicinity of the anti-driving side end portion 2*c* is large, and specifically, the amount of the adhesive is 5% greater than that at the part of the anti-driving side end portion 2*c*.

In addition, according to the ball screw device, there is also a case where the driving side end portion 2*b* and the anti-driving side end portion 2*c* are common fixing ends. In this case, by the rotation of a bearing which is not illustrated and which supports the screw shaft 2 and the traveling of the nut 3, a center portion of the screw shaft 2 in the axis direction extends and contracts. According to this, since the spiral member 8 also extends, the spiral member 8 which adheres to the center portion of the screw shaft 2 is likely to be peeled off. Accordingly, it is preferable to set the amount of adhesive of the center portion greater, specifically, 5% greater than that of the adhesive in the driving side end portion 2*b* and the anti-driving side end portion 2*c*.

In addition, as a fixing method, the entire spiral member 8 may be heated in an externally fitted state, and the entire spiral member may contract in the radial direction. The spiral member 8 contracts in the radial direction and is firmly wound around the outer circumferential surface of the cylindrical body 5 or the recessed portion 6, and maintains the firmly wound state. At this time, the adhesive may be used together.

The spiral member 8 is made of metal, and while a linear expansion coefficient of the spiral member 8 is approximately 10 to $12 \times 10^{-6}$ mm/° C., a linear expansion coefficient of the cylindrical body 5 is approximately $-1.3 \times 10^{-6}$ to $0.4 \times 10^{-6}$ mm/° C., for example, in a case of carbon fiber reinforced plastic, and thus, when the entire body is heated in a state where the spiral member 8 is externally fitted to the cylindrical body 5, the cylindrical body 5 contracts along the filament bundle, and the entire body contracts. Meanwhile, the spiral member 8 largely expands in a length direction of the spiral, and according to this, contracts in the radial direction, and fastens the outer circumferential surface of the cylindrical body 5. As a result, the spiral member 8 is firmly fixed to the outer circumferential surface of the cylindrical body 5. Furthermore, as a heating temperature, approximately 80° C. is appropriate. In addition, in a case of coating the recessed portion 6 of the cylindrical body 5 with the adhesive, the cylindrical body 5 contracts, and thus, the adhesive does not spill over from the recessed portion 6.

Figure 6:
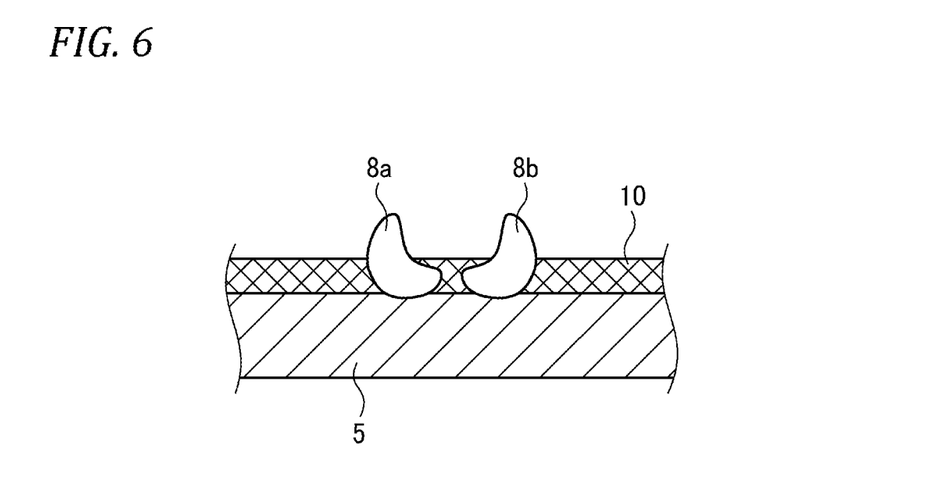
FIG. 6 is a sectional view describing a method for fixing a spiral member by the filament winding method in the first embodiment.
Figure 7:
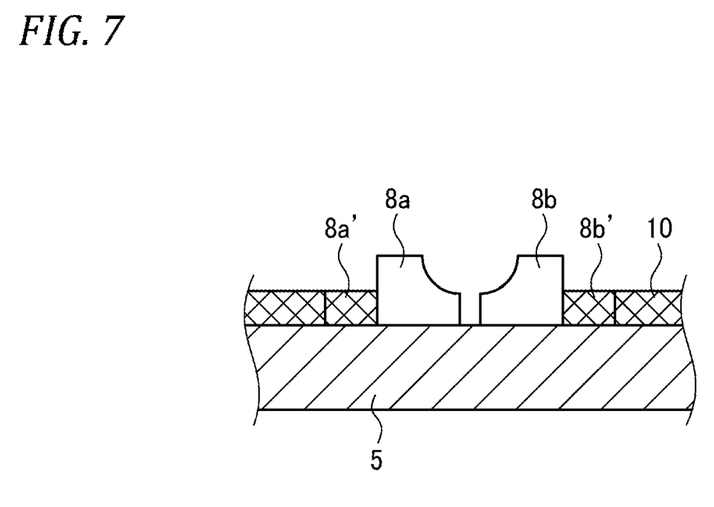
FIG. 7 is a sectional view describing another method for fixing the spiral member by the filament winding method in the first embodiment.

Otherwise, as illustrated in FIGS. 6 and 7, in a gap between the adjacent spiral members, the filament bundle may be wound again by the filament winding method. FIG. 6 is a sectional view illustrating an example thereof, and a filament bundle 10 is wound to cover a lower part of the spiral members 8*a* and 8*b*. In addition, as illustrated in FIG. 7, below the spiral members 8*a* and 8*b*, extending portions 8*a*' and 8*b*' which are respectively oriented outward may be provided, and the filament bundle 10 may be wound around the extending portions 8*a*' and 8*b*'. At this time, the adhesive may be used together.

Above, on the outer circumferential surface of the shaft member made of the cylindrical body 5, the spiral member 8 that becomes the thread groove is fixed, thereby the screw shaft 2 of the present invention is obtained. In the screw shaft 2 of the present invention, the strength substantially increases compared to the screw shaft which is made of fiber reinforced plastic in which reinforced fibers are dispersed, abrasion resistance of the thread groove is also improved, and durability becomes excellent.

Figure 8:
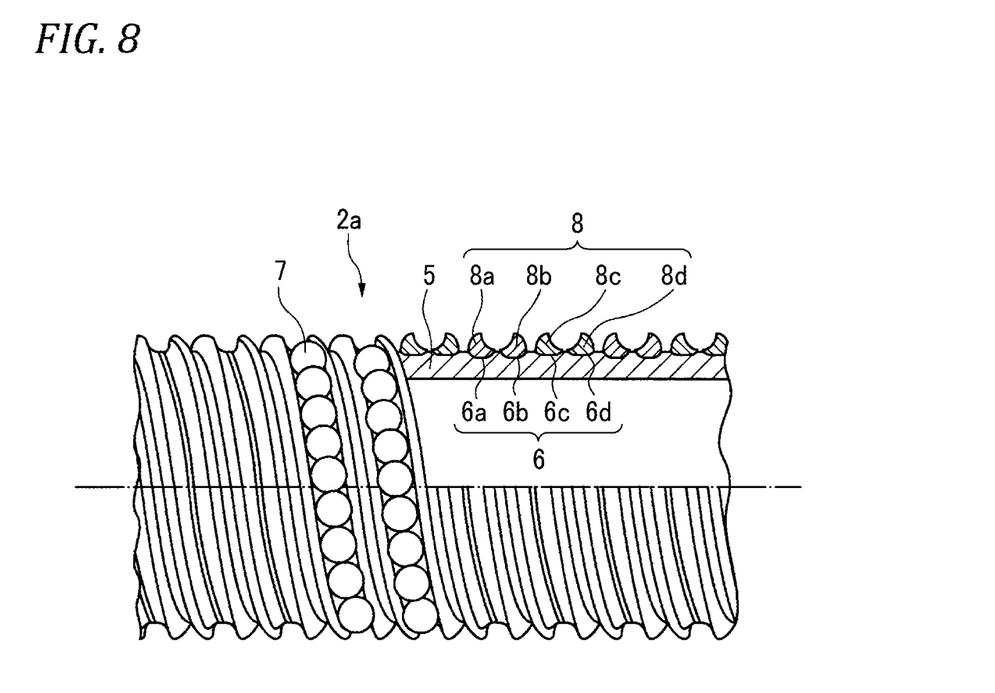
FIG. 8 is a partially cut-out plan view illustrating another example of the screw shaft in the first embodiment.

Furthermore, FIG. 5 is a case where the thread groove having one thread in which one pair of spiral members 8*a* and 8*b* are fixed to recessed portions 6*a* and 6*b* is formed, but the thread groove is not limited thereto, and the thread groove with multiple threads can be employed. For example, as illustrated in FIG. 8, a thread groove having two threads can also be formed by the spiral members 8*a* to 8*d*. In this case, in the cylindrical body 5, the corresponding recessed portions 6*a* to 6*d* are formed.

Figure 9:
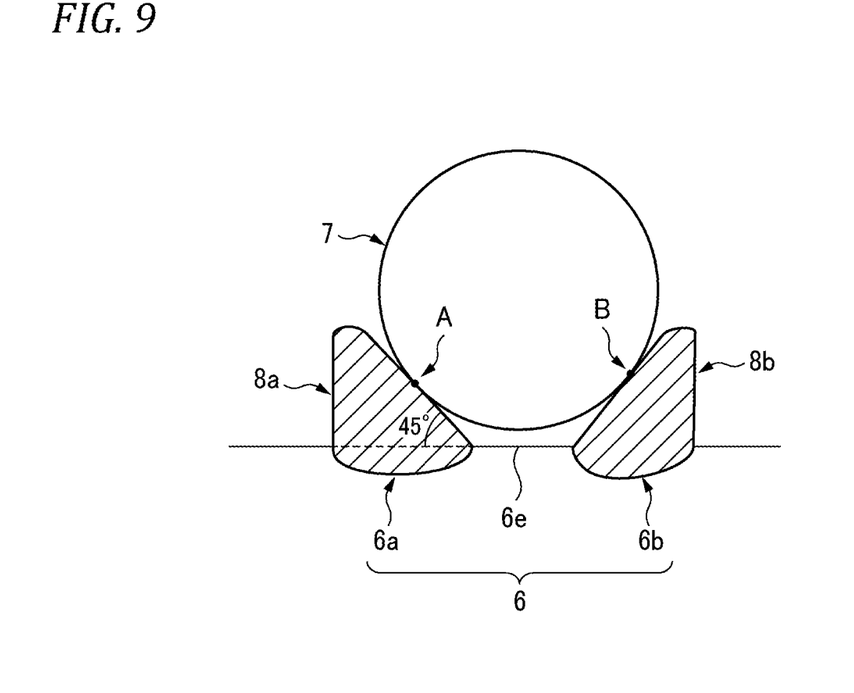
FIG. 9 is a sectional view illustrating an example of a sectional shape of the spiral member.

In addition, in the spiral member 8, a protruding height from the screw shaft 2 or an inclined angle of a surface on which the ball 7 rolls is adjusted such that the ball 7 does not come into contact with a bottom surface 6*e* (refer to FIG. 9) of the recessed portion 6 of the screw shaft 2. When the ball 7 rolls and comes into contact with the bottom surface 6*e* of the recessed portion 6, the bottom surface 6*e* of the recessed portion 6 which is made of fiber reinforced plastic is worn. Here, the protruding height or the inclined surface of the spiral member 8 is adjusted. For example, as illustrated in FIG. 9, by setting the inclined angle of the surface, on which the ball 7 rolls, of the spiral members 8a and 8b to be 45° with respect to the outer circumferential surface of the cylindrical body 5, the ball 7 is supported at two points including points A and B, and it is possible to set the ball not to come into contact with the bottom surface 6e of the recessed portion 6.

Figure 10:
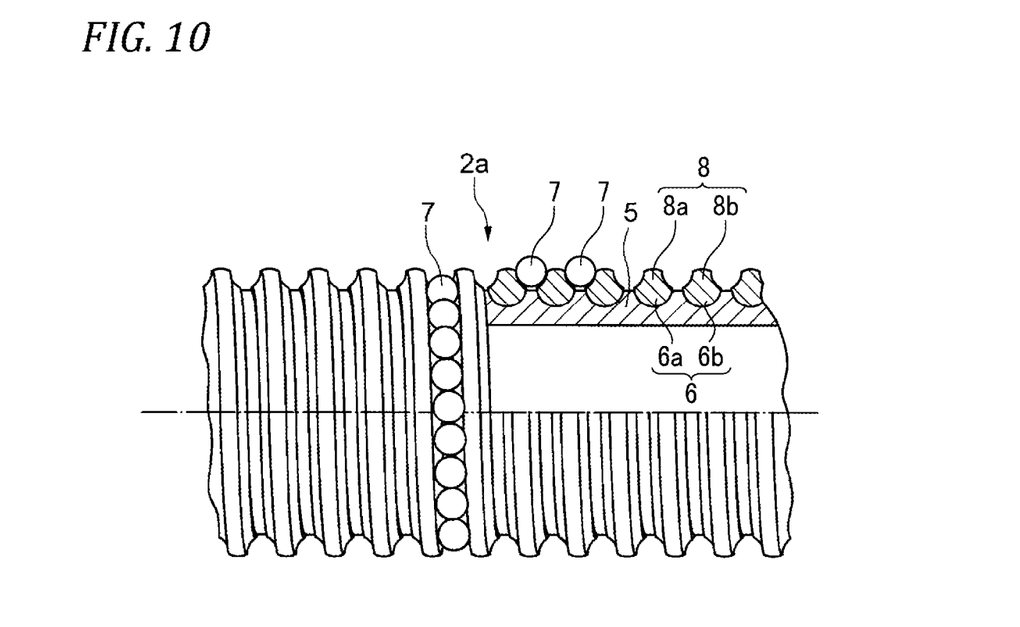
FIG. 10 is a partially cut-out plan view illustrating another example of the spiral member.

Furthermore, the spiral member 8 is not limited to the description above, and for example, as illustrated in FIG. 10, may be configured to have a sectional shape in which a lower half which becomes the cylindrical body 5 side is an arc shape and an upper part of which a diameter contracts as approaching upward, thereby forming a substantial "shape of an eggplant." As illustrated in the drawing, in the spiral member 8 of which the section has the "shape of an eggplant", the thread grooves are provided on both sides, and the thread groove having two threads is formed by three spiral members 8. Therefore, the number of spiral members 8 can be reduced, and as a result, the weight can be reduced. In addition, since the number of spiral members 8 is reduced, the number of recessed portions 6 is also reduced, the number of processing locations is also reduced, and further, the using amount of the adhesive can also be reduced, and as a result, the manufacturing costs can also be reduced. In addition, the interval between the spiral members 8 can be narrowed, the number of balls can increase as much as the interval narrows, and thus, it is possible to increase a load capacity to be greater than that of the screw shaft in which the thread groove is formed by one pair of spiral members 8.

Figure 11:
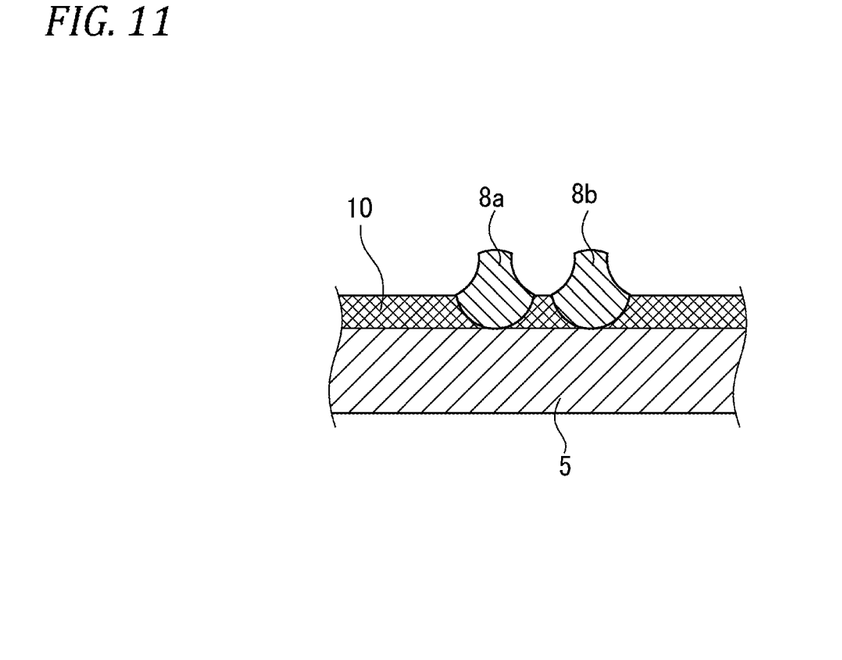
FIG. 11 is a sectional view describing a method for fixing the spiral member illustrated in FIG. 10 by the filament winding method.

In addition, as illustrated in FIG. 11, the spiral member 8 having a section of the "shape of an eggplant" is fixed to the cylindrical body 5 using the filament bundle 10 by the filament winding method. Otherwise, the spiral member 8 may be fixed to the cylindrical body 5 by using the adhesive or by performing thermal contraction.

Figure 12:
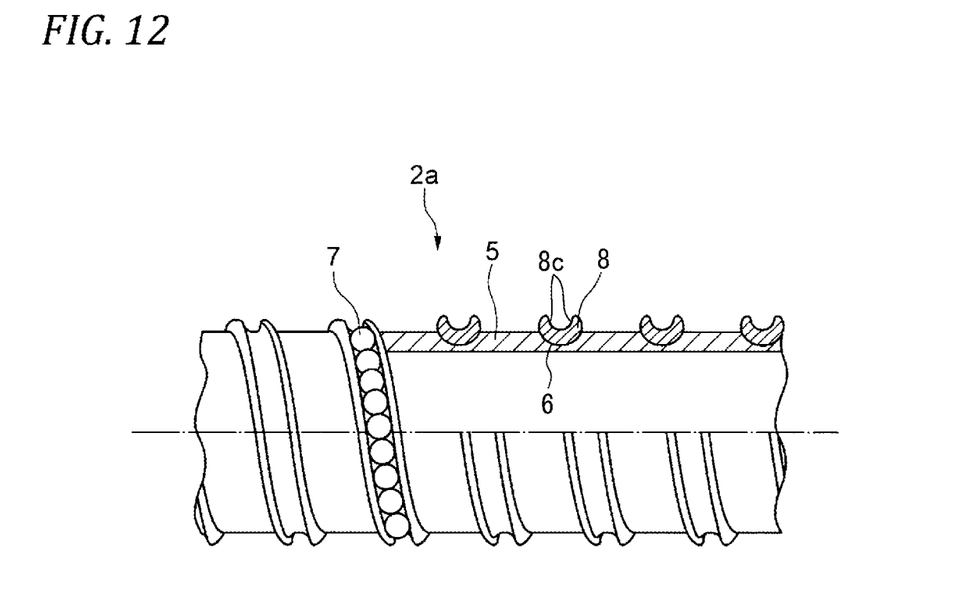
FIG. 12 is a partially cut-out plan view illustrating still another example of the spiral member.

In addition, in the description above, the thread groove having one thread is formed by one pair of spiral members 8a and 8b, but as illustrated in FIG. 12, a configuration in which the sectional shape having a "shape of crescent" linked to a lower part that becomes the cylindrical body 5 side, can be employed, and the thread groove having one thread can also be formed by one spiral member. In the spiral member 8 having a section having the "shape of crescent", both tip ends 8c and 8c come into contact with the ball 7. Furthermore, the shape of the groove formed of both tip end portions 8c and 8c can also be a shape of Gothic arch in addition to the arc shape. By using the spiral member 8 having a section of the "shape of crescent", the number thereof can be set to be the minimum, and further weight reduction or low costs can be realized.

Figure 13:
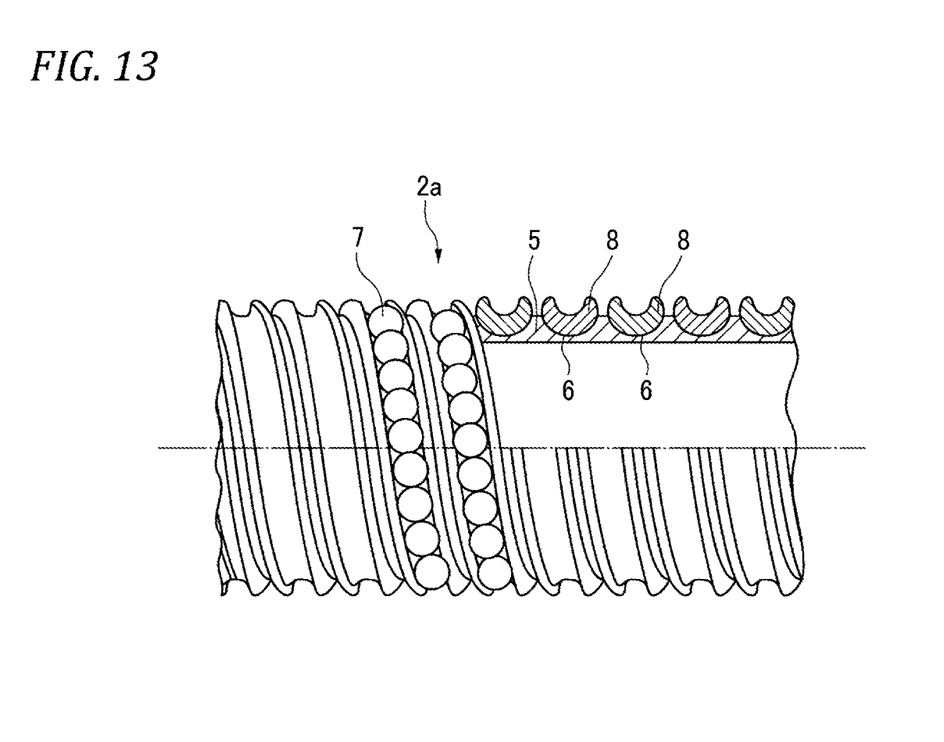
FIG. 13 is a partially cut-out plan view illustrating still another example of the spiral member.
Figure 14:
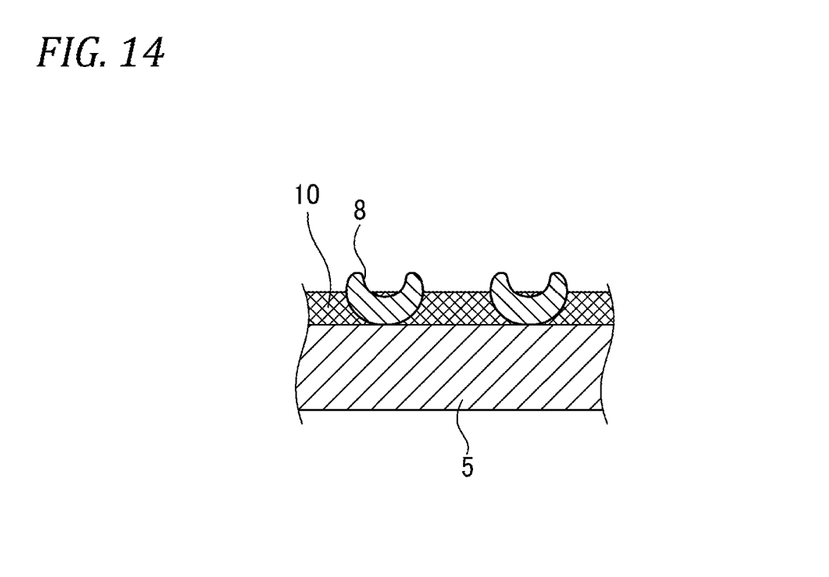
FIG. 14 is a sectional view describing a method for fixing the spiral member illustrated in FIG. 12 or 13 by the filament winding method.

Furthermore, by using the spiral member 8 having a section of the "shape of crescent", as illustrated in FIG. 13, the thread groove having multiple threads can also be formed. By using the thread groove having multiple threads, the number of active coils increases, and by reducing the ball size, the number of balls increases, whereby high rigidity and high load capacity can be achieved while maintaining high helix Furthermore, as illustrated in FIG. 14, the spiral member 8 having a section of the "shape of crescent" can also be fixed to the cylindrical body 5 by being fixed to the cylindrical body 5 by the filament bundle 10 by the filament winding method, by using the adhesive, or by the thermal contraction.

In addition, the nut 3 may be made of metal, but in order to reduce the weight of the entire ball screw device, it is preferable to manufacture the nut 3 by fiber reinforced plastic, and further, by the filament winding method or by the sheet winding method similar to the screw shaft 2.

Second Embodiment

Figure 15:
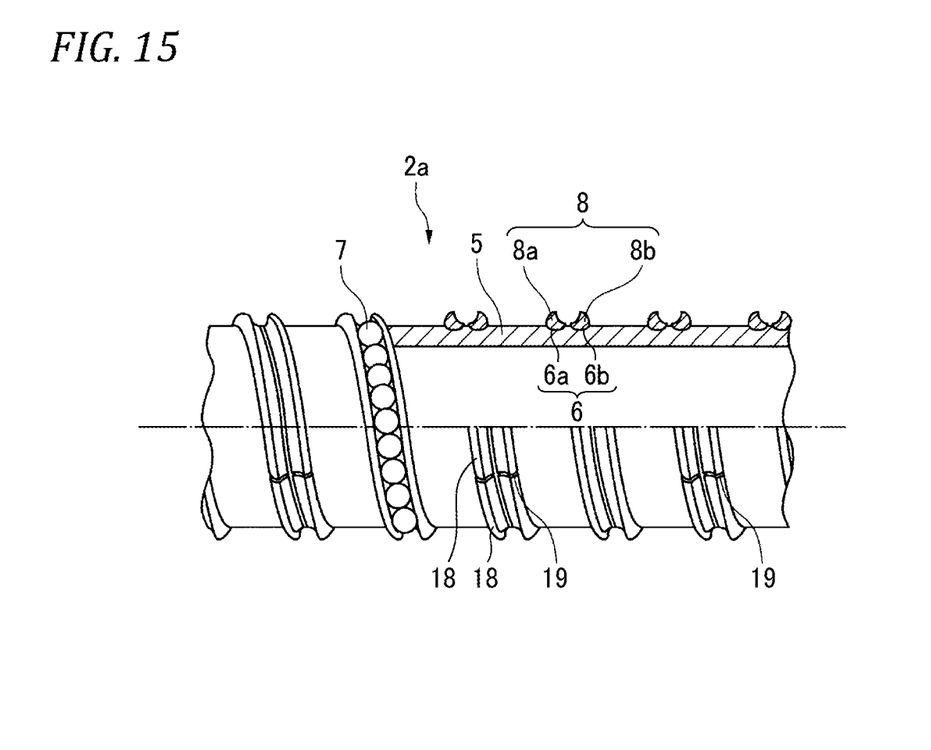
FIG. 15 is a partially cut-out plan view illustrating an example of a screw shaft in a second embodiment.
Figure 16:
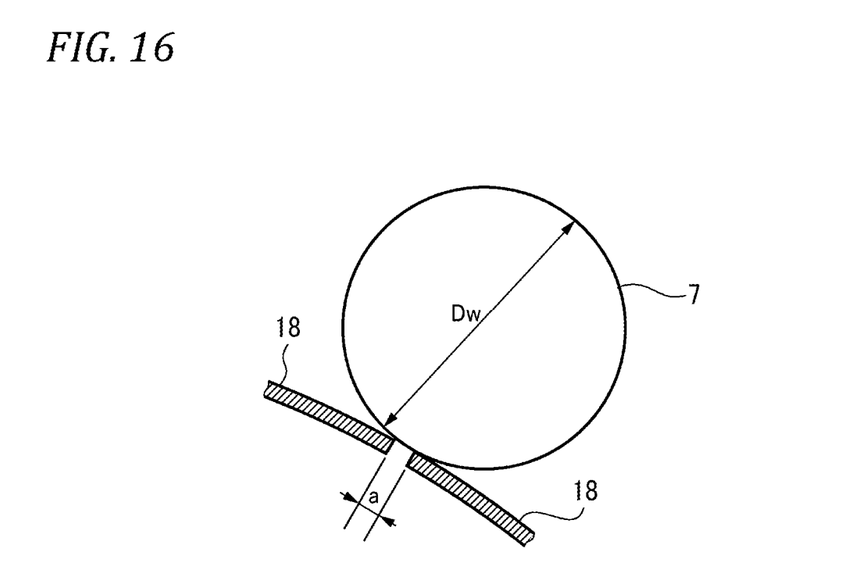
FIG. 16 is a schematic view for describing a relationship between a gap (a) between partitioned spiral members and a diameter (Dw) of a ball.
Figure 17:
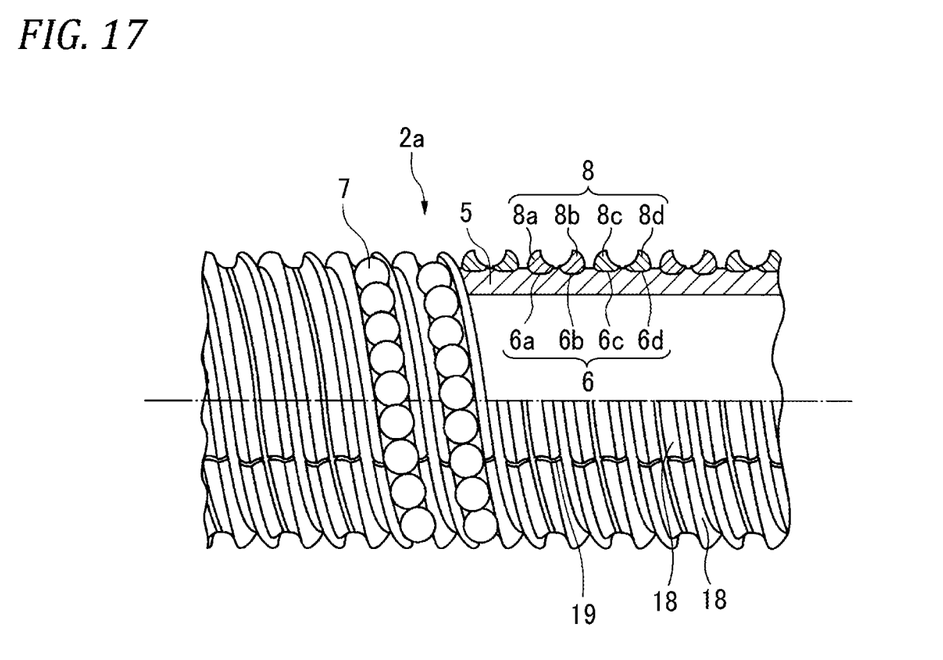
FIG. 17 is a partially cut-out plan view illustrating another example of the screw shaft in the second embodiment.

In a second embodiment illustrated in FIGS. 15 to 17, a partitioned spiral member 18 partitioned in the length direction is used instead of the spiral member 8 of the above-described first embodiment.

Furthermore, similar to the first embodiment, the cylindrical body is manufactured in accordance with the filament winding method or the sheet winding method.

In addition, the partitioned spiral members 18 are fixed to the outer circumferential surface of the cylindrical body 5, as one spiral member 8 (for example, 8a or 8b), by being connected to each other with a gap in the length direction. The connected state is illustrated in FIG. 15, and each of the partitioned spiral members 18 is described to have a length as long as circulating around the cylindrical body 5 substantially two times in a spiral shape along the recessed portion 6 in the example illustrated in the drawing, but the length of the partitioned spiral member 18 is not limited thereto.

In the ball screw device 1, the ball 7 rolls by the rotation of the screw shaft 2 and the movement of the nut 3, but according to this, an increase in temperature occurs, and the diameter of the screw shaft 2 expands or contracts. For example, in general carbon fiber reinforced plastic, a linear expansion coefficient is approximately $-1.3 \times 10^{-6}$ to $0.4 \times 10^{-6}$ mm/° C. Here, as illustrated in FIG. 16, corresponding to the expansion or contraction of the screw shaft 2, regarding a dimension (a) of a gap 19 between the partitioned spiral members, a diameter (Dw) of the ball 7 is preferably 0.3% to 13%, and is more preferably 3% to 10%. When (a/Dw) exceeds 13%, rolling properties of the ball 7 deteriorates. When (a/Dw) decreases to be less than 0.3%, the expansion amount is not completely absorbed, and the fixed state to the recessed portion 6 deteriorates. As an example, a relationship with a in a case of Dw=3.175 mm is illustrated in Table 2.

TABLE 2

| Dimension "a" of gap (mm) | 0.01 | 0.1 | 0.3 | 0.4 |
|---|---|---|---|---|
| a/Dw (%) | 0.3 | 3 | 10 | 13 |

Dw = 3.175 mm

In manufacturing the screw shaft 2, the plurality of partitioned spiral members 18 are consecutively externally fitted to the cylindrical body 5, and are fixed to the cylindrical body 5 while adjusting the dimension of the gap 19. At this time, a part of the inner circumferential surface of the partitioned spiral member 18 is embedded in the recessed portion 6, and is fixed to the recessed portion 6. As a fixing method of the partitioned spiral member 18 there is a method that a part of the inner circumferential surface of the partitioned spiral member 18 is embedded in the recessed portion 6 coated with the adhesive and the adhesive is then cured. Furthermore, it is preferable that the adhesive is the same type as the binder resin which is used in the filament winding method or in the sheet winding method for manufacturing the cylindrical body 5. By using the same type of the adhesive and the binder resin, the adhesiveness between the partitioned spiral member 18 and the cylindrical body 5 increases.

In addition, considering the extension of the partitioned spiral member 18 by heat generated by the rotation of the bearing which is not illustrated and which supports the screw shaft 2 and the travel of the nut 3, it is preferable to set the amount of adhesive which fixes the center portion in the length direction to be greater than that of both end portions on the gap side, and specifically, to increase the amount of the adhesive by 5%.

Otherwise, similar to FIG. 6, in a state where a part of the inner circumferential surface of the partitioned spiral member 18 is embedded in the recessed portion 6, the filament bundle may be wound in a gap between the adjacent partitioned spiral members 18 again by the filament winding method. In addition, similar to FIG. 7, the extending portion (8a' and 8b' in FIG. 7) which are respectively oriented outward may be provided below the partitioned spiral member 18, and the filament bundle may be wound around the extending portion.

Furthermore. FIG. 15 is a case where the thread groove having one thread in which one pair of spiral members 8a and 8b are fixed to the recessed portions 6a and 6b is formed, but the thread groove is not limited thereto, and multiple threads can be employed. For example, as illustrated in FIG. 17, a thread groove having two threads can also be formed of the spiral members 8a to 8d. In this case, in the cylindrical body 5, the corresponding recessed portions 6a to 6d are formed.

Similar to FIG. 9, in the partitioned spiral member 18, a case where the surface on which the ball rolls is used as an inclined surface having 45° and the ball and the bottom surface of the recessed portion do not come into contact with each other, is also possible.

Furthermore, the partitioned spiral member 18 may have a section having a "shape of an eggplant" illustrated in FIG. 10, and can also have a section having a "shape of crescent" illustrated in FIGS. 12 and 13.

The present invention is not limited to the above-described embodiment, and various changes are possible. For example, the sectional shape of the spiral member 8 is illustrated as a groove shape of which the section in the "shape of crescent" is a shape of Gothic arch, but the shape of Gothic arch can also be employed in the thread groove configured of one pair of spiral members 8a and 8b. In other words, for example, in FIG. 9, in a state where each of facing surfaces (a surface on a side having the point A and the point B which are in contact with the ball 7) of one pair of spiral members 8a and 8b face each other, the entire section has a shape of Gothic arch.

In addition, in the description above, the spiral member 8 is embedded in the recessed portion 6 of the cylindrical body 5 and the position is regulated, but without forming the recessed portion 6 in the cylindrical body 5, the spiral member 8 can also be externally fitted. As described above, the spiral member 8 is a metal spring member, and can hold a substantially constant interval by the elastic force. For example, in the spiral members 8a and 8b in FIG. 7, the extending portions 8a' and 8b' are provided, a surface (bottom portion) on the cylindrical body side including the extending portions 8a' and 8b' is flat, and a contact area between the cylindrical body 5 and the outer circumferential surface widens. Therefore, even when the recessed portion 6 is not formed on the outer circumferential surface of the cylindrical body 5, the spiral member 8 can stably exist on the outer circumferential surface of the cylindrical body 5. Therefore, it is possible to reduce the number of the groove processing for forming the recessed portion 6 in the cylindrical body 5, and to reduce the manufacturing costs.

DESCRIPTION OF REFERENCE NUMERALS AND SIGNS

1 ball screw device
2 screw shaft
2a thread groove portion
2b driving side end portion
2c anti-driving side end portion
3 nut
3a tubular portion
3b flange
4a, 4b piece
5 cylindrical body
6, 6a to 6d recessed surface
6e bottom surface
7 ball
8, 8a to 8d spiral member
10 filament bundle
18 partitioned spiral member
19 gap

The invention claimed is:

1. A screw shaft in a ball screw device including the screw shaft in which thread grooves are formed on an outer circumferential surface, a plurality of balls which are disposed on the thread grooves, and a nut which is externally fitted to the screw shaft via the balls, the nut moving on the screw shaft, at least a part of the screw shaft comprising:
   a cylindrical body formed of a cylindrical wound material configured of a filament bundle of reinforced fibers, a cylindrical wound material configured of a sheet of a filament of reinforced fibers, or a cylindrical wound material which is a laminated layer of a layer configured of the sheet and a layer configured of the filament bundle, and a resin binding the cylindrical wound material; and
   a metal spiral member which is fixed to an outer circumferential surface of the cylindrical body and forms the thread groove,
   wherein the spiral member is configured of a plurality of partitioned spiral members which are partitioned in a length direction of a spiral, and the partitioned spiral members are connected to each other with a gap in the length direction.

2. The screw shaft according to claim 1,
   wherein the gap in the length direction of the spiral between the partitioned spiral members is 0.3% to 13% of a diameter of the ball.

3. The screw shaft according to claim 1, wherein the outer circumferential surface of the cylindrical body and the spiral member or the partitioned spiral member are fixed to each other by an adhesive.

4. A manufacturing method of a screw shaft in a ball screw device including the screw shaft in which thread grooves are formed on an outer circumferential surface, a plurality of rolling bodies which are disposed on the thread grooves, and a nut which is externally fitted to the screw shaft via the rolling bodies, the nut moving on the screw shaft, the method comprising:
   a cylindrical body manufacturing process of making a cylindrical body by a filament winding method using a filament bundle of reinforced fibers, a cylindrical body by a sheet winding method using a sheet configured of the filament bundle, or a cylindrical body obtained by laminating a layer made by the sheet winding method and a layer made by the filament winding method; and an integration process of fixing a metal spiral member which forms the thread groove on an outer circumferential surface of the cylindrical body, wherein the spiral member is a partitioned spiral member which is partitioned in a length direction thereof, and in the integration process, a plurality of the partitioned spiral members are connected to each other on the outer circumferential surface of the cylindrical body with a gap in the length direction and are fixed to the outer circumferential surface.

5. The manufacturing method of the screw shaft according to claim 4, wherein the gap in the length direction of a spiral between the partitioned spiral members is 0.3% to 13% of a diameter of the ball.

6. The manufacturing method of the screw shaft according to claim 4, wherein, in the integration process, the spiral member or the partitioned spiral member adheres to the outer circumferential surface of the cylindrical body by an adhesive.

7. The manufacturing method of the screw shaft according to claim 4, wherein, in the integration process, the spiral member is disposed on the outer circumferential surface of the cylindrical body, and is heated, and the entire spiral member contracts in a radial direction thereof.

8. A ball screw device comprising:

a screw shaft in which thread grooves are formed on an outer circumferential surface;

a plurality of balls which are disposed on the thread grooves; and a nut which is externally fitted to the screw shaft via the balls, the nut moving on the screw shaft, wherein at least a part of the screw shaft includes:

a cylindrical body formed of a cylindrical wound material configured of a filament bundle of reinforced fibers, a cylindrical wound material configured of a sheet of a filament of reinforced fibers, or a cylindrical wound material which is a laminated layer of a layer configured of the sheet and a layer configured of the filament bundle, and a resin binding the cylindrical wound material; and a metal spiral member which is fixed to an outer circumferential surface of the cylindrical body and forms the thread groove, and wherein the spiral member is configured of a plurality of partitioned spiral members which are partitioned in a length direction of a spiral, and the partitioned spiral members are connected to each other with a gap in the length direction.

* * * * *